US009309932B2

(12) United States Patent
Yoshimura

(10) Patent No.: US 9,309,932 B2
(45) Date of Patent: Apr. 12, 2016

(54) POWER TRANSMISSION APPARATUS

(75) Inventor: Takahiro Yoshimura, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/379,359

(22) PCT Filed: Mar. 7, 2012

(86) PCT No.: PCT/JP2012/001551
§ 371 (c)(1),
(2), (4) Date: Aug. 18, 2014

(87) PCT Pub. No.: WO2013/132533
PCT Pub. Date: Sep. 12, 2013

(65) Prior Publication Data
US 2015/0038295 A1 Feb. 5, 2015

(51) Int. Cl.
F16D 28/00 (2006.01)
F16D 23/12 (2006.01)
F16D 13/52 (2006.01)
B60W 10/02 (2006.01)
B60W 10/11 (2012.01)
B60K 17/35 (2006.01)
B60K 23/08 (2006.01)

(52) U.S. Cl.
CPC .............. *F16D 13/52* (2013.01); *B60W 10/02* (2013.01); *B60W 10/11* (2013.01); *F16D 23/12* (2013.01); *F16D 28/00* (2013.01); *B60K 17/3515* (2013.01); *B60K 23/0808* (2013.01); *F16D 2023/123* (2013.01); *Y10T 477/6425* (2015.01)

(58) Field of Classification Search
CPC ..................... F16D 28/00; F16D 2023/123
See application file for complete search history.

(56) References Cited

U.S. PATENT DOCUMENTS

| 7,806,797 B2 | 10/2010 | Gassmann et al. | |
| 2004/0116230 A1* | 6/2004 | Hakui | F16H 63/3043 475/149 |
| 2004/0180748 A1* | 9/2004 | Puiu | B60K 17/02 475/198 |
| 2009/0127063 A1* | 5/2009 | Ishida | F16D 28/00 192/93 A |
| 2009/0229905 A1* | 9/2009 | Kato | B60K 23/0808 180/249 |

FOREIGN PATENT DOCUMENTS

| JP | 2005-273801 | 10/2005 |
| JP | 2009-220593 | 10/2009 |

OTHER PUBLICATIONS

International Search Report issued May 29, 2012, in PCT/JP2012/001551, filed Mar. 7, 2012.

* cited by examiner

*Primary Examiner* — Ramya Burgess
*Assistant Examiner* — Mark Manley
(74) *Attorney, Agent, or Firm* — Oblon, McClelland, Maier & Neustadt, L.L.P.

(57) ABSTRACT

A power transmission apparatus comprises an input shaft, an output shaft, a clutch device, and an actuator. The clutch device comprises a clutch hub, a clutch housing, a clutch pack, an input side cam mechanism for pressing the clutch pack toward the output shaft, an output side cam mechanism for pressing the clutch pack toward the input shaft, a return spring for urging the clutch pack to have its elements moved away from each other, and a drive shaft having an input side gear for transmitting the driving force of the actuator to the input side cam mechanism, and an output side gear for transmitting the driving force of the actuator to the output side cam mechanism.

7 Claims, 14 Drawing Sheets

POWER TRANSMISSION APPARATUS

TECHNICAL FIELD

The present invention relates to a power transmission apparatus, and more particularly to a power transmission apparatus having a clutch device operative with an output torque of an actuator.

BACKGROUND ART

In general, a clutch device of this kind forming part of a power transmission apparatus is provided with a cam mechanism that can increase an output torque of an actuator to enhance a frictional engagement force of the clutch device, thereby increasing a torque transmission amount of a power transmission apparatus. The torque increasing function of the cam mechanism as such makes it possible not only to downsize the actuator but also to realize designing a small clutch pack.

The cam mechanism is schematically shown in FIG. 11 to comprise a drive side cam plate 101 driven by the actuator to rotate in a direction shown by an arrow "a", a driven side cam plate 102, and a spherical member 103. The spherical member 103 is sandwiched between a cam surface 101a formed on the drive side cam plate 101 and a cam surface 102a formed on the driven side cam plate 102 to be capable of being rolled between the cam surface 101a and the cam surface 102a. When the drive side cam plate 101 is rotated around its center axis in the direction shown by the arrow "a" to have the cam surface 101a moved by a length Ls, the spherical member 103 is adapted to be moved in an axial direction shown by an arrow "b". By the movement of the spherical member 103, the driven side cam plate 102 is moved by a length Lx to press friction engagement elements forming parts of the clutch device.

The cam mechanism is constructed to have a circumferential force Fs acted on the spherical member 103 and an axial force Fx acted on the driven side cam plate 102 when the torque is inputted to the drive side cam plate 101 from the actuator, the circumferential force Fs and the axial force Fx being associated with the shapes of the cam surfaces 101a, 102a. The circumferential movement amount Ls of the drive side cam plate 101 and an axial movement amount Lx of the driven side cam plate 102 are also associated with the shapes of the cam surfaces 101a, 102a.

In other words, the circumferential force Fs and the axial force Fx are acted on the driven side cam plate 102 through the spherical member 103 when the drive side cam plate 101 is inputted with the torque in the direction shown by the arrow "a" as shown in FIG. 12. If the angle between the cam surface 102a and the surface 102b perpendicular to the axial direction of the driven side cam plate 102 is assumed to be a cam angle $\alpha$, the force Fx can be represented by the equation $Fx = Fs \div \tan \alpha$. The movement amount Lx can be indicated by the equation $Lx = Ls \times \tan \alpha$.

The axial force Fx acted on the driven side cam plate 102 is increased in response to the reduced cam angle $\alpha$ to increase the force pressing the friction engagement elements of the clutch device with the same magnitudes of the circumferential forces Fs as shown in FIG. 13, thereby increasing the frictional engagement force of the clutch device. On the other hand, with the same circumferential movement Ls as shown in FIG. 14, the axial movement amount Lx acted on the driven side cam plate 102 is increased in response to the increased cam angle $\alpha$, thereby improving the responsiveness of the clutch device.

In the clutch device provided with the cam mechanism thus constructed, increasing the frictional engagement force of the clutch device results in lowering the responsiveness of the clutch device, while enhancing the responsiveness of the clutch device leads to lowering the frictional engagement force of the clutch device. This means that the frictional engagement force of the clutch device and the responsiveness of the clutch device are in contradicting relations with each other, so that there is a requirement for structural improvement of the clutch device, which results in requiring the clutch device to structurally be improved in order to enhance both of the frictional engagement force and the responsiveness of the clutch device.

On the other hand, there have been developed in recent years power transmission apparatuses adapted to cut off the power transmitted from the driven driving wheel forming part of a four-wheel drive vehicle and to stop the rotation of a rotation member in the power transmission path, thereby removing the frictional resistance generated by the rotation of the rotation member for the purpose of improving the fuel consumption of the vehicle. The power transmission apparatuses thus constructed are required to enlarge gaps between the friction engagement elements of the clutch pack in order to reduce the rotational resistance or a drag torque caused in the released state of the clutch device capable of cutting off the power. The power transmission apparatus thus required encounters such a problem that the clutch pack is structurally enlarged. In addition, the enlarged gaps between the friction engagement elements of the clutch pack leads to the strokes of the friction engagement elements of the clutch pack to be brought into engagement with one another, so that the power transmission apparatus encounters such a problem that the responsiveness is lowered.

In this respect, the power transmission apparatus provided with such a clutch device to be operated by the magnetic force of an electromagnet coil is relatively improved in responsiveness. However, the power transmission apparatus has such a drawback to generate the drag torque between the friction engagement elements of the clutch pack prior to an engagement state of the clutch device with the magnetic force of the electromagnet coil. For reliably reducing such a drag torque, there is the clutch device which is operated by the output torque of an actuator such as a motor and the like. The above clutch device is required to reduce the rotational speed of the actuator with a high reduction gear to obtain a predetermined frictional engagement force of the clutch device, so that the power transmission apparatus encounters such a problem that the responsiveness of the clutch device is further lowered in addition to the increased gaps between the friction engagement elements of the clutch device.

As a cam mechanism forming part of the power transmission apparatus, there has so far been known a cam mechanism having two different cam angles (see for example Patent Documents 1, 2).

The cam mechanism disclosed in the Patent Document 1 is constructed to have a plurality of grooves equi-distantly on the circumference of the cam plate. The grooves include a first large cam angle groove and a second small cam angle groove alternatively in the circumference direction of the cam plate. On the other hand, the cam mechanism disclosed in the Patent Document 2 is constructed to have a plurality of grooves equi-distantly on the circumference of the cam plate. The grooves include two different cam angle areas constituted by a non-linear area between a cam angle $\theta_0$ and a cam angle $\theta_1$ and a linear area from the cam angle $\theta_1$ to the cam angle $\theta$max. Each of the disclosed cam mechanisms has a spherical member sandwiched between the grooves to be capable of being rolled in the grooves. Known cam mechanisms are constructed to have the cam angles of the first large cam angle groove and the non-linear area enlarged, so that the axial movement amount is increased with respect to the circumferential movement amount, thereby making it possible to promptly narrow the gaps between the friction engagement elements, and thus to obtain a relatively high responsiveness. On the other hand, the known cam mechanisms are constructed to have the cam angles of the second large cam angle groove and the linear area reduced, so that the circumferential movement amount is increased with respect to the axial movement amount, thereby making it possible to increase the axial force, and thus to obtain a relatively high frictional engagement force of the clutch device.

CITATION LIST

Patent Literature

Patent Document 1: US Patent Specification No. 7806797
Patent Document 2: Japanese Patent Application Publication No. 2009-220593

SUMMARY OF INVENTION

Technical Problem

However, each of the cam mechanisms disclosed in the Patent Documents 1, 2 is constructed to have a plurality of grooves equi-distantly on the circumference of the cam plate and having two different cam angles, so that each of the cam mechanisms encounters such a problem as follows.

The cam plate has a circumference portion formed with a plurality of grooves each having a large cam angle and a small cam angle. The grooves respectively receive therein spherical members in such a manner that the spherical members are required to be positioned at the same cam angle while rolling in the grooves. If the spherical members are positioned at the different cam angles in the grooves, the spherical members are partly active or partly not active in operation, thereby resulting in the cam actions deviated in a cam mechanism, and thereby leading to uneven pressing forces against the friction engagement elements causing one of the undesirable problems the cam mechanism encounters. In order to make uneven the pressing forces, the cam mechanism is required to make the two different cam angles of the grooves in high precision and to dispose the grooves on the circumference of the cam plate at the most desired positions, thereby leading to such a problem as making it difficult to reduce the production cost of the cam mechanism.

The present invention has been made to solve the foregoing problems the conventional cam mechanism encounters, and therefore has an object to provide a power transmission apparatus provided with the clutch device which can require no high precision machining and reduce the drag torque, as well as can have a high responsiveness and a large engagement force.

Solution to Problem

For solving the foregoing problems, the power transmission apparatus according to the present invention (1) comprising an input shaft inputted with a power, an output shaft for outputting the power, a clutch device operative to be changed to selectively take a disconnected state in which the power is disconnected between the input shaft and the output shaft or a connected state in which the power is connected between the input shaft and the output shaft, and an actuator for driving the clutch device, the clutch device comprising an input side rotation element integrally rotated with the input shaft, an output side rotation element integrally rotated with the output shaft, an engagement element pack constituted by a plurality of input side friction engagement elements integrally rotated with the input side rotation element and a plurality of output side friction engagement elements integrally rotated with the output side rotation element, an input side cam mechanism that presses the engagement element pack toward the output shaft, an output side cam mechanism that presses the engagement element pack toward the input shaft, an urging element that urges the engagement element pack to have the input side friction engagement elements and the output side friction engagement elements axially moved away from each other, and a drive shaft having an input side transmission element that transmits a driving force outputted from the actuator to the input side cam mechanism, and an output side transmission element that transmits the driving force to the output side cam mechanism, the input side cam mechanism and the output side cam mechanism being driven by the rotation of the drive shaft.

By the construction of the power transmission apparatus as set forth in the above definition, the power transmission apparatus according to the present invention can dispense with high precision machining of the input side cam mechanism and the output side cam mechanism, thereby making it possible to suppress the production cost from being increased. The power transmission apparatus can be set to enlarge the gaps between the input side friction engagement elements and the output side friction engagement elements, thereby making it possible to reduce the drag torque. The output side cam mechanism can promptly press the engagement element pack, and the input side cam mechanism can heighten a frictional engagement force of the engagement element pack, thereby making it possible to obtain the clutch device with a high responsiveness and a high transmission capacity.

The power transmission apparatus according to the present invention may preferably be so constructed that (2) the input side transmission element is constituted by an input side gear, the input side cam mechanism having an input side drive cam plate formed with a gear held in mesh with the input side gear, an input side driven cam plate, a plurality of spherical members respectively sandwiched between a plurality of cam grooves formed on the circumferential portion of the input side drive cam plate and a plurality of cam grooves formed on the circumferential portion of the input side driven cam plate respectively facing the cam grooves of the circumferential portion of the input side drive cam plate, the input side drive cam plate being rotated to have the input side driven cam plate axially moved toward the output shaft through the spherical members and thereby to press the engagement element pack.

By the construction of the power transmission apparatus as set forth in the above definition, the power transmission apparatus according to the present invention can be constructed to have the input side cam mechanism constituted by an input side drive cam plate, an input side driven cam plate, and a plurality of spherical members, the input side drive cam plate and the input side driven cam plate being respectively formed with a plurality of cam grooves each having a cam angle which can be formed with a relatively small angle. As a consequence, the drive force inputted to the input side drive cam plate can be increased to heighten the pressing force to the engagement element pack of the input side driven cam plate.

The power transmission apparatus according to the present invention may preferably be so constructed that (3) the output side transmission element is constituted by an output side gear, the output side cam mechanism having an output side drive cam plate formed with a gear held in mesh with the output side gear, an output side driven cam plate, a plurality of spherical members respectively sandwiched between a plurality of cam grooves formed on the circumferential portion of the output side drive cam plate and a plurality of cam grooves formed on the circumferential portion of the output side driven cam plate respectively facing the cam grooves of the circumferential portion of the output side drive cam plate, the output side drive cam plate being rotated to have the output side driven cam plate axially moved toward the input shaft through the spherical members and thereby to press the engagement element pack.

By the construction of the power transmission apparatus as set forth in the above definition, the power transmission apparatus according to the present invention can be constructed to have the output side cam mechanism constituted by the output side drive cam plate, the output side driven cam plate, and a plurality of spherical members, the output side drive cam plate and the output side driven cam plate being respectively formed with a plurality of cam grooves each having a cam angle which can be formed with a relatively large angle. As a consequence, the movement amount of the spherical member on the circumference of the output side drive cam plate can be increased and converted, thereby making it possible to promptly bring the engagement element pack into a frictional engagement state by means of the output side driven cam plate.

The power transmission apparatus according to the present invention may preferably be so constructed that (4) the cam grooves of the output side drive cam plate and the output side driven cam plate are formed to have the output side driven cam plate take a movement stopped state where the output side driven cam plate is at a standstill even with the rotation of the output side drive cam plate, and the cam grooves of the input side drive cam plate and the input side driven cam plate are preferably formed to have the input side driven cam plate axially moved toward the output shaft with the rotation of the input side drive cam plate after the output side drive cam plate is rotated to take the movement stopped state.

By the construction of the power transmission apparatus as set forth in the above definition, the power transmission apparatus according to the present invention can be constructed to have the cam grooves formed to have the output side driven cam plate take the movement stopped state where the output side driven cam plate is at a standstill even with the rotation of the output side drive cam plate. As a consequence, the power transmission apparatus according to the present invention can axially move the input side driven cam plate toward the output shaft by the rotation of the input side drive cam plate after the output side drive cam plate is rotated to take the movement stopped state. If the output side cam mechanism is operated to press the engagement element pack concurrently with the pressing operation to the engagement element pack by the input side cam mechanism, the pressing force of the input side cam mechanism and the pressing force of the output side cam mechanism are opposite to each other on the same line of action and acted in the pressing direction with each other, thereby leading to the fact that the pressing forces of the input side cam mechanism and the output side cam mechanism are cancelled by the principle of action and reaction. For this reason, the power transmission apparatus according to the present invention can be constructed to have the output side driven cam plate take the movement stopped state and to have the pressing force of the output side cam mechanism reduced to zero, thereby making it possible to avoid the state in which the pressing forces of the input side cam mechanism and the output side cam mechanism are cancelled. As a consequence, the power transmission apparatus according to the present invention can obtain a predetermined suitable pressing force by continuing the operation of the input side cam mechanism to press the engagement element pack in the movement stopped state of the output side driven cam plate.

The power transmission apparatus according to the present invention may preferably be so constructed that (5) the input side driven cam plate preferably has an input side movement amount axially moved toward the output shaft by the rotation of the drive shaft, and the output side driven cam plate has an output side movement amount axially moved toward the input shaft by the rotation of the drive shaft, the cam grooves of the output side drive cam plate and the output side driven cam plate are formed to have the output side movement amount larger than the input side movement amount.

By the construction of the power transmission apparatus as set forth in the above definition, the power transmission apparatus according to the present invention can be constructed with the cam grooves of the output side drive cam plate and the output side driven cam plate being formed to have the output side movement amount larger than the input side movement amount, thereby making it possible to obtain the high responsiveness at the output side cam mechanism. Further, the power transmission apparatus according to the present invention can obtain a high pressing force at the input side cam mechanism, thereby making it possible to obtain a high frictional engagement force as well as to obtain the clutch device which has the high transmission capacity.

The power transmission apparatus according to the present invention may preferably be so constructed that (6) the input side cam mechanism has an input side radius connecting the center point of the spherical member forming part of the input side cam mechanism and the center axis of the input shaft, the output side cam mechanism has an output side radius connecting the center point of the spherical member forming part of the output side cam mechanism and the center axis of the output shaft, and the cam grooves of the output side drive cam plate and the output side driven cam plate are formed to have the output side radius of the output side cam mechanism larger than the input side radius of the input side cam mechanism, so that a movement of the output side driven cam plate can be faster than the movement of the input side driven cam plate.

By the construction of the power transmission apparatus as set forth in the above definition, the power transmission apparatus according to the present invention can be constructed to have the output side radius of the output side cam mechanism larger than the input side radius of the input side cam mechanism, so that the movement of the output side driven cam plate can be faster than the movement of the input side driven cam plate. Further, the power transmission apparatus according to the present invention can obtain a high pressing force at the input side cam mechanism, thereby making it possible to obtain a high frictional engagement force as well as to obtain a clutch device which has a high transmission capacity.

The power transmission apparatus according to the present invention may preferably be so constructed that (7) the output side gear and a gear of the output side drive cam plate are preferably formed to have the gear ratio of the output side gear of the drive shaft and the gear of the output side drive cam plate become smaller than a gear ratio of the input side gear of the drive shaft and the gear of the input side drive cam plate, so that the movement of the output side driven cam plate can be faster than the movement of the input side driven cam plate.

By the construction of the power transmission apparatus as set forth in the above definition, the power transmission apparatus according to the present invention can be constructed to have the gear ratio of the output side gear of the drive shaft and the gear of the output side drive cam plate become smaller than the gear ratio of the input side gear of the drive shaft and the gear of the input side drive cam plate, so that the power transmission apparatus according to the present invention can obtain the high responsiveness at the output side cam mechanism. Further, the power transmission apparatus according to the present invention can obtain the high pressing force at the input side cam mechanism, thereby making it possible to obtain a high frictional engagement force as well as to obtain the clutch device which has the high transmission capacity.

Advantageous Effects of Invention

The present invention can provide a power transmission apparatus provided with the clutch device which can require no high precision machining and reduce the drag torque, as well as can have the high responsiveness and the large engagement force.

DESCRIPTION OF EMBODIMENTS

A power transmission apparatuses according to the first and second embodiments of the present invention will be described hereinafter with reference to the accompanying drawings. Each of the power transmission apparatuses according to the first and second embodiments of the present invention will be raised for explanation as an example applied to the power transmission apparatus of a vehicle 1.

(First Embodiment)

Figure 1:
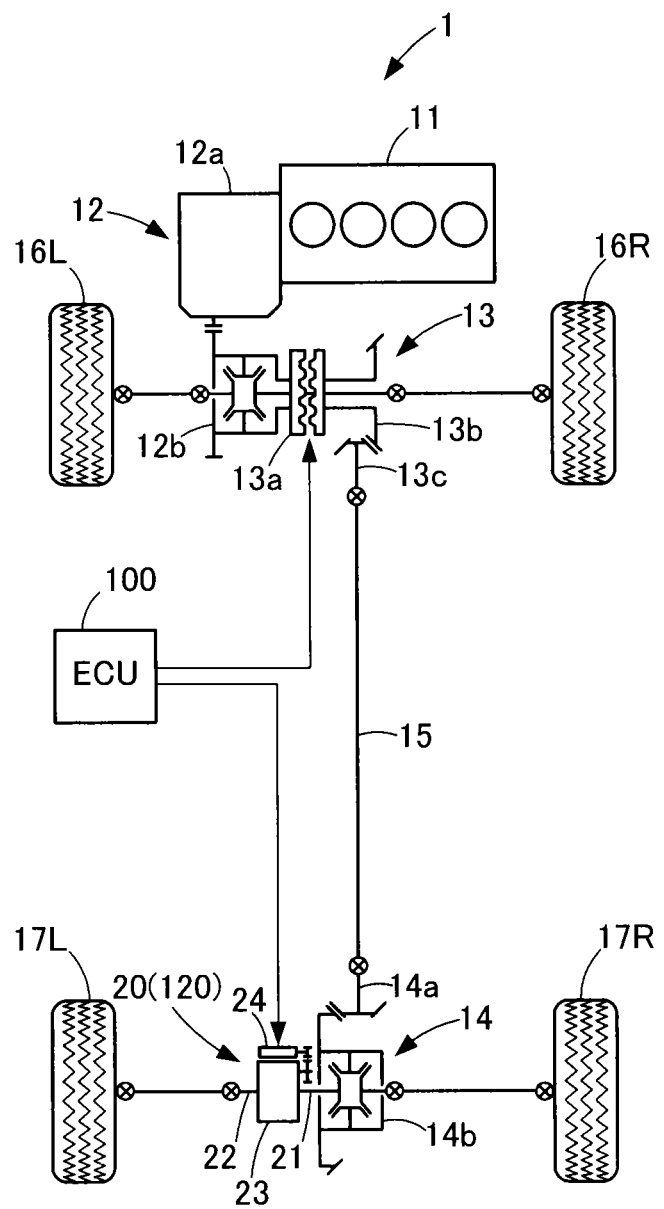
FIG. 1 is a schematic construction view of a vehicle provided with a power transmission apparatus according to the first embodiment of the present invention.

As shown in FIG. 1, the vehicle 1 bases a front engine front drive type, and is thus constituted by what is called a part time four-wheel drive vehicle (hereinafter simply referred to as a "part time 4WD") which is adapted to automatically be changed to selectively take a front two wheel drive state or a four-wheel drive state.

The vehicle 1 comprises an engine 11, a transaxle 12, a transfer 13, a rear differential 14, a propeller shaft 15, left and right front wheels 16L, 16R, left and right rear wheels 17L, 17R, and a power transmission apparatus 20. The vehicle 1 is further provided with an electronic control unit (hereinafter simply referred to as an "ECU") 100 for controlling various devices and mechanisms mounted on the vehicle 1.

The engine 11 is constructed by a horizontally placed straight four-cylinder engine which may be replaced by any other types of engine. For example, the engine 11 may be constructed to have a single cylinder or multi-cylinders such as three cylinders, six cylinders and the like, and a vertically placed engine, or otherwise a V-shape engine. Further, the engine 11 may be of a type including a gasoline engine and a diesel engine.

The transaxle 12 is constructed to include a transmission 12a and a front differential 12b. The transmission 12a is constructed to convert and output the rotational speed of a crankshaft forming part of the engine 11 to the front differential 12b, at a speed ratio according to a running state of the vehicle 1. The front differential 12b is constructed to transmit the power inputted from the transmission 12a to the left and right front wheels 16L, 16R.

The transfer 13 has a clutch device 13a, a transfer ring gear 13b, and a transfer driven pinion 13c. The clutch device 13a is constituted by a clutch device mechanism such as a dog clutch device and the like not having a mechanism to synchronize a rotational speed, and is disposed between the front differential 12b and the transfer ring gear 13b.

The clutch device 13a is constructed to selectively take a connected state or a disconnected state by the command of the ECU 100, so that the power can be transmitted or not transmitted between the front differential 12b and the transfer ring gear 13b. The transfer ring gear 13b is thus drivably connected with the front differential 12b, so that the power outputted from the engine 11 is transmitted to the transferred ring gear 13b through the front differential 12b. The transfer driven pinion 13c is held in mesh with the transfer ring gear 13b to convert the power at a right angle and to output the power to the propeller shaft 15.

The rear differential 14 has a drive pinion 14a and a differential mechanism 14b. The rear differential 14 is adapted to transmit the power inputted from the propeller shaft 15 to the left and right rear wheels 17L, 17R.

The propeller shaft 15 is disposed between the transfer driven pinion 13c and the drive pinion 14a to transfer the power from the transfer driven pinion 13c to the drive pinion 14a.

The left and right front wheels 16L, 16R are adapted to be driven while being allowed to differentially be rotated by the power transmitted from the front differential 12b. Similarly, the left and right rear wheels 17L, 17R are adapted to be driven while being allowed to differentially be rotated by the power transmitted from the rear differential 14.

The power transmission apparatus 20 is disposed between the differential mechanism 14b and the left rear wheel 17L, and comprises an input shaft 21, an output shaft 22, a clutch device 23, and an actuator 24. The input shaft 21 and the output shaft 22 constitute in combination a drive shaft for transmitting the power from the differential mechanism 14b to the left rear wheel 17L in such a manner that the power between the input shaft 21 and the output shaft 22 can be changed selectively into the connected state or into the disconnected state. The input shaft 21 is drivably connected with the differential mechanism 14b, while the output shaft 22 is drivably connected with the left rear wheel 17L.

Figure 2:
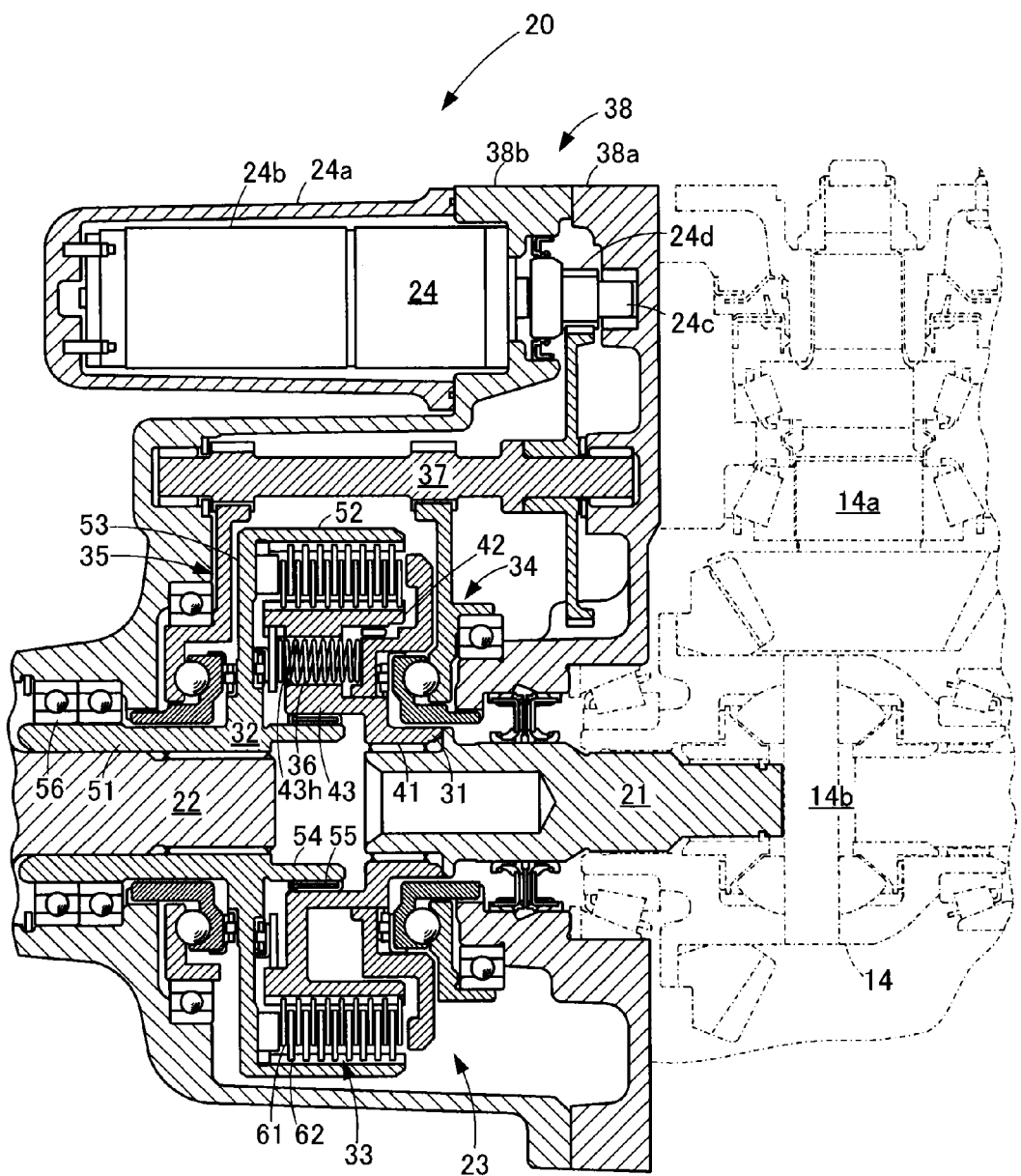
FIG. 2 is a cross-sectional view of the power transmission apparatus according to the first embodiment of the present invention.
Figure 3:
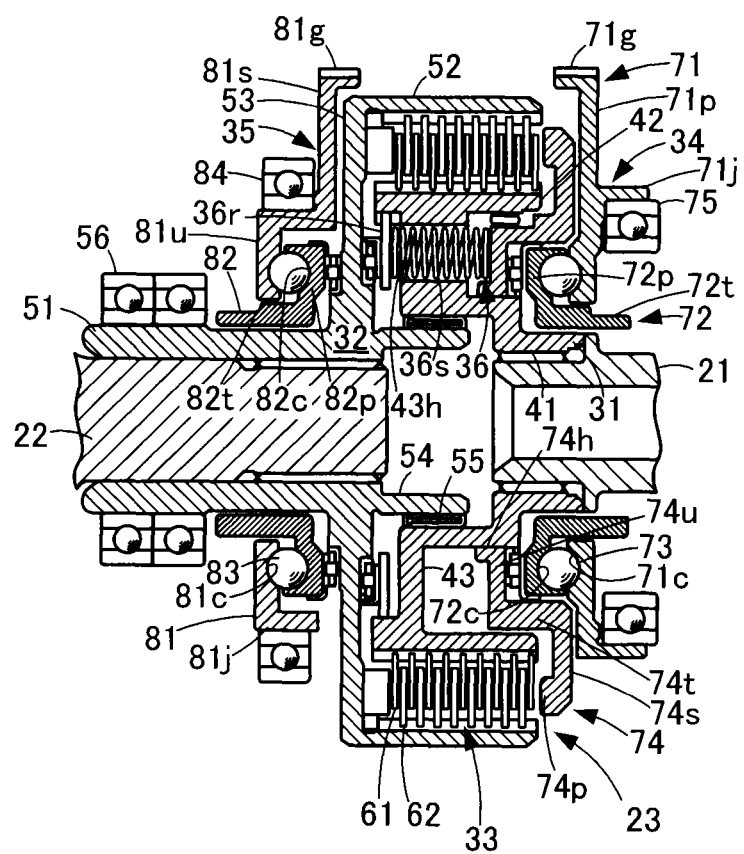
FIG. 3 is a cross-sectional view of an essential portion forming part of the power transmission apparatus according to the first embodiment of the present invention.

The clutch device 23 is constructed as shown in FIGS. 2, 3 to include a clutch hub 31 constituting an input side rotation element as defined in the present invention, a clutch housing 32 constituting an output side rotation element as defined in the present invention, a clutch pack 33 constituting a plurality of engagement elements as defined in the present invention, an input side cam mechanism 34, an output side cam mechanism 35, a return spring 36 constituting an urging element as defined in the present invention, a drive shaft 37, and a case 38 for accommodating the above constitutional elements and parts.

The clutch hub 31 has an inner cylindrical portion 41, an outer cylindrical portion 42, and an annular connection portion 43. The inner cylindrical portion 41 has an inner peripheral portion formed with spline inner teeth held in mesh with spline outer teeth formed on the end portion of the input shaft 21 facing the output shaft 22. The outer cylindrical portion 42 is formed with the spline outer teeth to have an outer peripheral portion support the clutch pack 33. The annular connection portion 43 has the inner cylindrical portion 41 and the outer cylindrical portion 42 connected with each other. The annular connection portion 43 has a peripheral portion formed with a plurality of through bores 43h equally spaced apart from one another. Each of the through bores 43h has a return spring 36 received therein.

The clutch housing 32 has an inner cylindrical portion 51, an outer cylindrical portion 52, and an annular connection portion 53. The inner cylindrical portion 51 has an inner peripheral portion formed with the spline inner teeth held in mesh with the spline outer teeth formed on the end portion of the output shaft 22 facing the input shaft 21. The outer cylindrical portion 52 is formed with the spline inner teeth on an inner peripheral portion thereof, so that the clutch pack 33 is supported between the inner peripheral portion and the outer cylindrical portion 42 of the clutch hub 31. The connection portion 53 has the inner cylindrical portion 51 and the outer cylindrical portion 52 connected with each other.

The clutch housing 32 has a support portion 54 cylindrically formed to extend toward the input shaft from the connection portion 53, and a bearing 55 fixedly supported on the outer peripheral surface of the support portion 54. The annular connection portion 43 of the clutch hub 31 is supported on the support portion 54 through the bearing 55 with the bearing 55 being held in contact with the outer peripheral surface of the support portion 54 and the inner surface of the annular connection portion 43. The clutch housing 32 has bearings 56 intervening between the case 38 and the outer peripheral surface of the inner cylindrical portion 51, so that the clutch housing 32 is constructed to smoothly be rotatable together with the output shaft 22 also supported on the case 38.

The clutch pack 33 has a plurality of inner clutch plates 61 and a plurality of outer clutch plates 62, the inner clutch plates 61 and the outer clutch plates 62 respectively constituting input side friction engagement elements and output side friction engagement elements as defined in the present invention. The clutch pack 33 is constructed to have lubricant oil introduced between the inner and outer clutch plates 61, 62 to lubricate and cool the inner and outer clutch plates 61, 62, and is thus constituted by what is called a multi-plate wet clutch device type. The clutch pack 33 is adapted to have the inner and outer clutch plates 61, 62 axially pressed and brought into frictional contact with one another, so that the power can be transmitted from the inner clutch plates 61 to the outer clutch plates 62.

Each of the inner clutch plates 61 has a central portion formed with an axial through bore and is thus formed in a disc shape. Each of the inner clutch plates 61 has an inner wall portion surrounding the through bore and formed with the spline inner teeth held in mesh with the spline outer teeth formed on the outer cylindrical portion 42. This means that the inner clutch plates 61 can be rotated integrally with the outer cylindrical portion 42 and can axially slide with respect to the outer cylindrical portion 42. The inner clutch plates 61 numbering nine for example are assembled with the outer cylindrical portion 42. Each of the inner clutch plates 61 has both surfaces adhered with a friction material having a high friction coefficient such as a paper, a semi-metal, a sintered metal and the like to strengthen a frictional engagement force of the clutch pack 33.

Similarly, each of the outer clutch plates 62 has a central portion formed with an axial through bore and is thus formed in a disc shape. Each of the outer clutch plates 62 has an outer wall portion surrounding the through bore and formed with the spline outer teeth held in mesh with the spline inner teeth formed on the outer cylindrical portion 52. This means that the outer clutch plates 62 can be rotated integrally with the outer cylindrical portion 52 and can axially slide with respect to the outer cylindrical portion 52. The outer clutch plates 62 numbering eight for example are sandwiched between the neighboring two inner clutch plates 61 and assembled with the outer cylindrical portion 52.

The clutch pack 33 is constructed to have the inner clutch plates 61 and the outer clutch plates 62 assembled with one another, so that the gaps between the inner clutch plates 61 and the outer clutch plates 62 being formed to be larger than those formed in these clutch plates assembled in the conventional clutch devices. If the gaps between the clutch plates are relatively small when the clutch pack 33 is released from the pressing from the both sides to be brought into a power disconnected state, the lubricant oil between the clutch plates gives rise to rotational resistance that is called a drag torque. The drag torque is apt to increase power loss, thereby leading to reducing the fuel consumption of the vehicle 1. In view of this phenomenon, the gaps between the clutch plates of the clutch pack 33 are set to prevent such a drag torque from being generated in the clutch pack 33.

The input side cam mechanism 34 is constructed as shown in FIG. 3 to comprise an input side drive cam plate 71, an input side driven cam plate 72, a plurality of spherical members 73, a pressure plate 74, and a bearing 75. The input side cam mechanism 34 is constructed to have the input side driven cam plate 72 axially moved toward the output shaft 22 to press the clutch pack 33 through the spherical members 73 with the rotation of the input side drive cam plate 71, and is thus constituted by what is called a ball cam mechanism.

The input side drive cam plate 71 has a journal portion 71j rotatably supported on a bearing 75 intervening between the case 38 and the journal portion 71j, a plate portion 71p formed in a disc shape, a gear portion 71g partly formed on the outer peripheral portion of the plate portion 71p, and a plurality of cam grooves 71c formed on the peripheral portion of the plate portion 71p to be circumferentially equally spaced apart from one another. The input side drive cam plate 71 is adapted to be rotated by the driving force of the actuator 24 inputted through the gear portion 71g.

Figure 4:
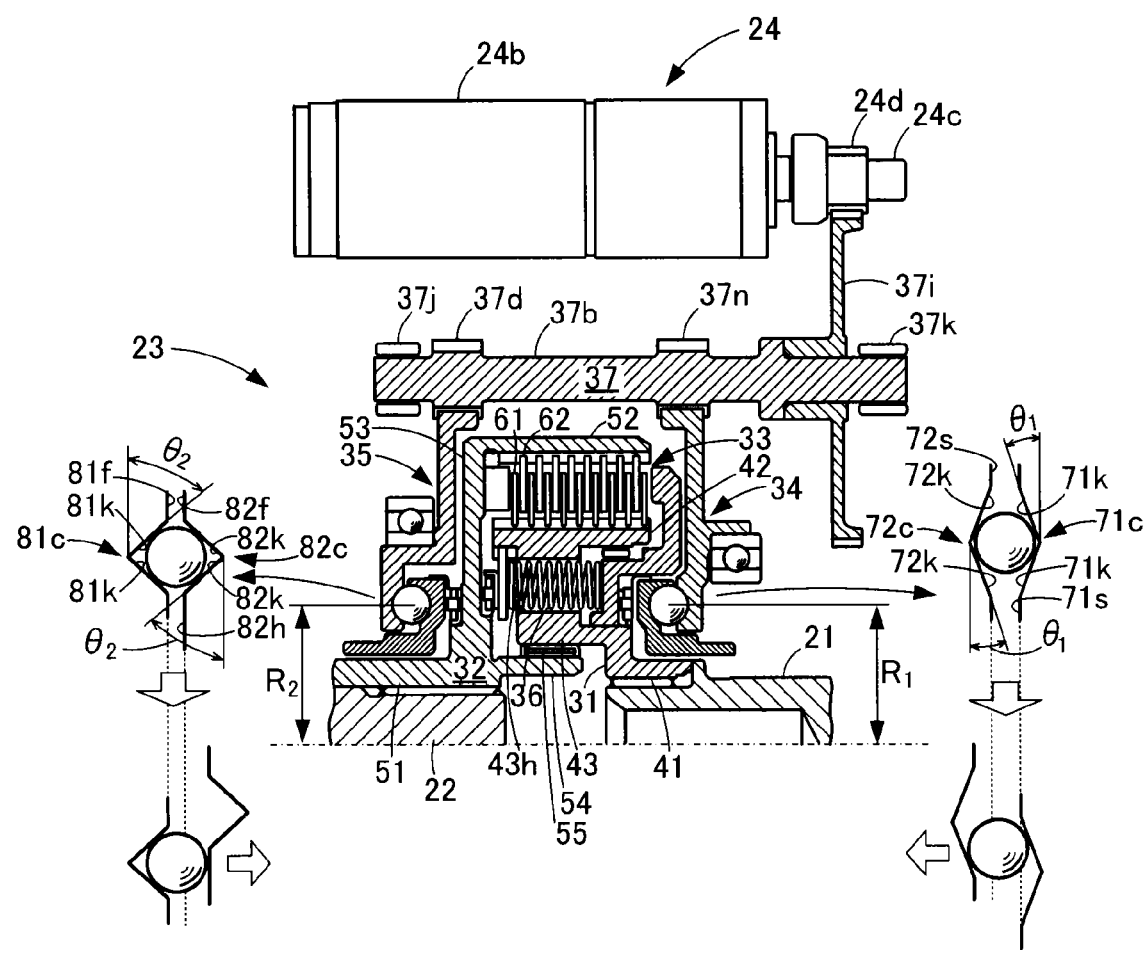
FIG. 4 is another cross-sectional view of the essential portion forming part of the power transmission apparatus according to the first embodiment of the present invention.

Each of the cam grooves 71c is formed as particularly shown in FIG. 4 to have a central portion deepest from the side surface 71s, and inclined surfaces 71k gradually shallow circumferentially inwardly and outwardly from the central portion. Each of the cam grooves 71c has an angle between the inclined surface 71k and the side surface 71s, i.e., a cam angle $\theta_1$. Each of the cam grooves 71c is formed to be positioned with the input side radius $R_1$ connecting the center of the cam groove 71c and the center axis of the input shaft 21. This means that the distance between the center point of the spherical member 73 and the center axis of the input shaft 21 is represented by the input side radius $R_1$ in the state that the spherical member 73 is sandwiched between the inclined surfaces 71k of the cam groove 71c. The cam groove 71c is formed by inclined surfaces 71k symmetrically expanding from the center of the cam groove 71c toward and away from the gear portion 71g, so that the inclined surfaces 71k can act on the spherical member 73 irrespective of the rotational direction of the input side drive cam plate 71.

The input side driven cam plate 72 has a plate portion 72p, a cylindrical portion 72t, and a plurality of cam grooves 71c. The cylindrical portion 72t is cylindrically formed at the radially inner side of the plate portion 72p to extend toward the input side drive cam plate 71, while cam grooves 72c are formed on a circumference of the plate portion 72p to be positioned in face-to-face relationship with the cam grooves 71c, respectively. The plate portion 72p and the cylindrical portion 72t are integrally formed with each other. The input side driven cam plate 72 is constructed to be axially moved away from the input side drive cam plate 71 through the spherical members 73 by the rotation of the input side drive cam plate 71.

Similarly to the cam grooves 71c, each of the cam grooves 72c is formed to have a central portion deepest from the side surface 72s, and inclined surfaces 72k gradually shallow circumferentially inwardly and outwardly from the central portion. Each of the cam grooves 72c has an angle between the inclined surface 72k and the side surface 72s, i.e., a cam angle $\theta_1$. Similarly to the cam grooves 71c, each of the cam grooves 72c is formed to be positioned with the input side radius $R_1$ connecting the center of the cam groove 72c and the center axis of the input shaft 21. This means that the distance between the center point of the spherical member 73 and the center axis of the input shaft 21 is represented by the input side radius $R_1$ in the state that the spherical member 73 is sandwiched between the inclined surfaces 72k of the cam groove 72c.

The spherical member 73 is made of a steel ball having a smooth surface and a high sphericalness, and is thus movable while rolling between the cam groove 71c of the input side drive cam plate 71 and the cam groove 72c of the input side driven cam plate 72 to have the frictional resistance between the spherical member 73 and the input side drive and driven cam plates 71, 72 prevented from being generated.

The axial movement amount (mm) of the input side driven cam plate 72 is decreased in response to the smaller cam angle $\theta_1$ while the axial movement amount (mm) of the input side driven cam plate 72 is increased in response to the larger cam angle $\theta_1$ when the circumferential movement amounts of the spherical members 73 caused by the rotation of the input side drive cam plate 71 are equal to each other. The axially converted force (N) of the input side driven cam plate 72 is increased in response to the smaller cam angle $\theta_1$ while the axially converted force (N) of the input side driven cam plate 72 is decreased in response to the larger cam angle $\theta_1$ when the circumferential forces (N) of the spherical members 73 caused by the rotation of the input side drive cam plate 71 are equal to each other.

The input side cam mechanism 34 is constructed to have the cam angles $\theta_1$ of the cam groove 71c and the cam groove 72c formed to be relatively small. The input side cam mechanism 34 is therefore constructed to have the small axial movement amount of the input side driven cam plate 72 caused by the rotation of the input side drive cam plate 71, while to have the driving force inputted to the input side drive cam plate 71 is increased and converted to the large axial force (N) of the input side driven cam plate 72.

The pressure plate 74 has an inner plate portion 74u, a cylindrical portion 74t, an outer plate portion 74s, and a pressure portion 74p. The inner plate portion 74u is radially inwardly formed in a disc shape. The cylindrical portion 74t is formed radially outwardly of the inner plate portion 74u in a cylindrical shape. The outer plate portion 74s is formed at an end portion of the cylindrical portion 74t in a disc shape. The pressure portion 74p is formed on the side surface of the outer plate portion 74s to project toward the clutch pack 33. The constitutional portions, viz., the inner plate portion 74u, the cylindrical portion 74t, the outer plate portion 74s, and the pressure portion 74p are integrally formed with each other.

The inner plate portion 74u is formed with an axially extending through bore 74h allowing the clutch hub 31 to pass therethrough, so that the pressure plate 74 can axially slide with respect to the clutch hub 31 while being guided by the clutch hub 31. The pressure plate 74 is adapted to be pressed by the input side driven cam plate 72 to axially be moved in response to the axial movement of the input side driven cam plate 72, so that the pressure portion 74p can be pressed to the clutch pack 33.

The output side cam mechanism 35 is constructed as shown in FIG. 3 to comprise an output side drive cam plate 81, an output side driven cam plate 82, a plurality of spherical members 83, and a bearing 84. The output side cam mechanism 35 is constructed to have the output side driven cam plate 82 axially moved toward the input shaft 21 to press the clutch housing 32 and the clutch pack 33 through the spherical members 83 with the rotation of the output side drive cam plate 81, and is thus constituted by what is called a ball cam mechanism.

The output side drive cam plate 81 has a journal portion 81j rotatably supported on a bearing 84 intervening between the case 38 and the journal portion 81j, an inner plate portion 81u formed in a disc shape at the one axial end portion of the journal portion 81j, an outer plate portion 81s formed in a disc shape at the other axial end portion of the journal portion 81j, a gear portion 81g partly formed on the outer peripheral portion of the outer plate portion 81s, and a plurality of cam grooves 81c formed on the peripheral portion of the inner plate portion 81u to be circumferentially equally spaced apart from one another. The constitutional portions, viz., the journal portion 81*j*, the inner plate portion 81*u*, the outer plate portion 81*s*, and the gear portion 81*g* are integrally formed with each other. The output side drive cam plate 81 is adapted to be rotated by the driving force of the actuator 24 inputted through the gear portion 81*g*.

Similarly to the cam grooves 71*c*, each of the cam grooves 81*c* is formed to have a central portion deepest from the side surface 81*f*, and inclined surfaces 81*k* gradually shallow circumferentially inwardly and outwardly from the central portion. Each of the cam grooves 81*c* has an angle between the inclined surface 81*k* and the side surface 81*f*, i.e., a cam angle $\theta_2$. Similarly to the cam grooves 81*c*, each of the cam grooves 81*c* is formed to be positioned with the output side radius $R_2$ connecting the center of the cam groove 81*c* and the center axis of the output shaft 22. This means that the distance between the center point of the spherical member 83 and the center axis of the output shaft 22 is represented by the output side radius $R_2$ in the state that the spherical member 83 is sandwiched between the inclined surfaces 81*k* of the cam groove 81*c*.

The output side driven cam plate 82 has a plate portion 82*p*, a cylindrical portion 82*t*, and a plurality of cam grooves 82*c*. The cylindrical portion 82*t* is cylindrically formed at the radially inner side of the plate portion 82*p* to extend toward the output side drive cam plate 81, while the cam grooves 82*c* are formed on a circumference of the plate portion 82*p* to be positioned in face-to-face relationship with the cam grooves 81*c*, respectively. The constitutional portions, viz., the plate portion 82*p* and the cylindrical portion 82*t* are integrally formed with each other. The output side driven cam plate 82 is constructed to be axially moved away from the output side drive cam plate 81 through the spherical members 83 by the rotation of the output side drive cam plate 81.

Similarly to the cam grooves 81*c*, each of the cam grooves 82*c* is formed to have a central portion deepest from the side surface 82*f*, and inclined surfaces 82*k* gradually shallower in the both circumferential directions from the central portion. Each of the cam grooves 82*c* has an angle between the inclined surface 82*k* and the side surface 82*f*, i.e., a cam angle $\theta_2$. Each of the cam grooves 82*c* has flat surfaces 82*h* at the both circumferential sides of the inclined surfaces 82*k*. The spherical member 83 rolls in the cam groove 82*c* in response to the rotation of the output side drive cam plate 81, and is then moved onto the flat surface 82*h*.

After the spherical member 83 is moved onto the flat surface 82*h*, the output side driven cam 82 takes the movement stopped state without axially being moved even if the output side drive cam plate 81 is rotated. When the input side cam mechanism 34 continues to be operated to press the clutch pack 33 in the state that the output side driven cam plate 82 takes a movement stopped state, the clutch pack 33 can be pressed at a predetermined pressing force. The output cam mechanism 35 can press the clutch pack 33 simultaneously with the input side cam mechanism 34 pressing the clutch pack 33, so that the pressing force of the input side cam mechanism 34 and the pressing force of the output side cam mechanism 35 are acted on the same line of action and opposite to each other in the directions for the input side cam mechanism 34 and the output side cam mechanism 35 to press the clutch pack 33. The pressing forces of the input side cam mechanism 34 and the output side cam mechanism 35 are reduced to the halves of the pressing forces with the relationship of the actions and reactions of the pressing forces. This means that if the output side driven cam plate 82 is in the movement stopped state, and the pressing force of the output side cam mechanism 35 is zero, the half reduced state of the pressing forces of the input side cam mechanism 34 and the output side cam mechanism 35 can be avoided.

Similarly to the cam grooves 81*c*, each of the cam grooves 82*c* is formed to have an output side radius $R_2$ connecting the center of the cam groove 82*c* and the center axis of the output shaft 22. This means that the distance between the center of the spherical member 83 and the center axis of the output shaft 22 is equal to the output side radius $R_2$, at the time when the spherical member 83 is received in the cam groove 82*c*. Here, the input side radius $R_1$ and the output side radius $R_2$ previously mentioned are substantially equal to each other.

The spherical member 83 is made of the same material and in the same shape as that of the spherical member 73, and is thus movable while rolling between the cam groove 81*c* of the output side drive cam plate 81 and the cam groove 82*c* of the output side driven cam plate 82 to have the frictional resistance between the spherical member 83 and the output side drive and driven cam plates 81, 82 prevented from being generated.

The axial movement amount (mm) of the output side driven cam plate 82 is decreased in response to the smaller cam angle $\theta_2$ while the axial movement amount (mm) of the output side driven cam plate 82 is increased in response to the larger cam angle $\theta_2$ when the circumferential movement amounts of the spherical members 83 caused by the rotation of the output side drive cam plate 81 are equal to each other. The axially converted force (N) of the output side driven cam plate 82 is increased in response to the smaller cam angle $\theta_2$ while the axially converted force (N) of the output side driven cam plate 82 is decreased in response to the larger cam angle $\theta_2$ when the circumferential forces (N) of the spherical members 83 caused by the rotation of the output side drive cam plate 81 are equal to each other.

The output side cam mechanism 35 is constructed to have the cam angles $\theta_2$ of the cam grooves 81*c* and 82*c* formed to be a relatively large. This means that the output side cam mechanism 35 is constructed to have the axial movement amount (mm) of the output side driven cam plate 82 caused by the rotation of the output side drive cam plate 81 set to be enlarged. This construction of the output side cam mechanism 35 makes it possible for the output side driven cam plate 82 to promptly axially be moved when the driving force of the actuator 24 is inputted to the output side drive cam plate 81. This means that the output side cam mechanism 35 can be more heightened in response than the input side cam mechanism 34.

The return spring 36 is constituted by a compression coil spring, and thus has a spring 36*s*, and a retainer 36*r* for supporting the end portion of the spring 36*s*. The return spring 36 is set at its one end with the inner plate portion 74*u* of the pressure plate 74 and at its other end with the connection portion 53 of the clutch housing 32 through the retainer 36*r*. The return spring 36 assembled as above functions to press and urge the pressure plate 74 away from the clutch housing 32. This construction of the return spring 36 makes it possible to return the clutch pack 33 to the disconnected state from the connected state.

The drive shaft 37 has a shaft body 37*b*, an input side gear 37*n*, an output side gear 37*d*, and an input gear 37*i*. The input side gear 37*n* and the output side gear 37*d* constitute an input side transmission element and an output side transmission element, respectively. The input gear 37*i* is adapted to be inputted with the driving force of the actuator 24. The drive shaft 37 has a bearing 37*j* and a bearing 37*k* assembled between the case 38 and the drive shaft 37 to have the both axial end portions of the shaft body 37*b* rotatably supported on the case 38. The input gear 37*i* is adapted to reduce the rotational speed of the actuator 24.

The input side gear 37*n* and the output side gear 37*d* are formed in the same shape and are driven together with the shaft body 37*b* by the actuator 24, so that the power can be reduced in rotational speed and transmitted from the input side gear 37*n* to the gear portion 71*g* of the input side drive cam plate 71, while the power can be reduced in rotational speed and transmitted from the output side gear 37*d* to the gear portion 81*g* of the output side drive cam plate 81.

The case 38 has an input side case 38*a* secured to the differential mechanism 14*b*, and an output side case 38*b* secured to the input side case 38*a*. The input side case 38*a* and the output side case 38*b* are secured to each other by fastening members such as bolts and the like not shown in the drawings. The case 38 has an inner space in which lubricant oil is filled to lubricate and cool the various elements and parts accommodated in the inner space.

The actuator 24 has a housing 24*a*, a motor 24*b*, an output shaft 24*c*, and an output gear 24*d* securely supported on the output shaft 24*c*. The actuator 24 is adapted to be controlled by the command of the ECU 100. The housing 24*a* accommodates therein the motor 24*b*, and is secured to the output side case 38*b*. The motor 24*b* is constituted by a known electric motor which can control the rotational angle like a stepping motor, and is constructed to output the power, i.e., the torque to the output shaft 24*c*. The motor 24*b* may be replaced by a geared motor which accommodates therein a reduction gear mechanism including the output shaft 24*c* and the output gear 24*d*.

The ECU 100 is adapted to control the clutch device 13*a* of the transfer 13 in response to the driving state of the vehicle to have the clutch device 13*a* automatically changed to selectively take the disconnected state in which the front two wheel drive is established with the left and right front wheels 16L, 16R respectively serving as drive wheels or the connected state in which the four-wheel drive is established with the left and right front wheels 16L, 16R, and the left and right rear wheels 17L, 17R respectively serving as drive wheels.

The ECU 100 comprises a CPU (Central Processing Unit) as a central processing unit, a ROM (Read Only Memory) for storing therein fixed data, a RAM (Random Access Memory) for storing data therein temporarily, an EEPROM (Electrically Erasable and Programmable Read Only Memory: Trademark) made of a rewritable non-volatile memory, and an input and output interface circuit (I/F), and is designed to carry out the overall control of the vehicle 1.

The ECU 100 is connected to various sensors not shown in the drawings. The ECU 100 is adapted to receive detection signals outputted from these sensors and to determine the travelling states including the power outputted from the engine 11 and the vehicle speed, so that the power transmission apparatus 20 can be controlled in response to the driving states.

Next, the operation of the power transmission apparatus 20 according to the first embodiment will be described hereinafter in association with the control of the vehicle 1.

When the engine 11 of the vehicle 1 shown in FIG. 1 is started, the front wheel two drive wheel is operated to have the clutch device 13*a* changed with the command of the ECU 100 to take the disconnected state in which the left and right front wheels 16L, 16R are driven by the engine 11 through the transaxle 12. At this time, the left and right rear wheels 17L, 17R respectively serve as driven wheels and thus are rotated at the same rotational speed as those of the left and right front wheels 16L, 16R. Depending on the driving state, during the travelling state in the front wheel two wheel drive, the power transmission apparatus 20 is changed from the connected state to the disconnected state by the ECU 100, so that the left and right rear wheels 17L, 17R are cut off from the power transmission path partly formed by the propeller shaft 15, viz., disconnected from the propeller shaft 15.

In this case, even if the left and right rear wheels 17L, 17R are rotated, the outputted power from the left and right rear wheels 17L, 17R is not transmitted to the drive pinion 14*a*, the propeller shaft 15, the transfer driven pinion 13*c* and the transfer ring gear 13*b* which are thus stopped. This stoppage of these rotation elements causes no rotational resistance caused by these rotation elements, thereby reducing the power loss and thus leading to improving the fuel consumption of the vehicle 1.

When there is a request made by the driver to travel with the four-wheel drive during the front wheel two wheel drive, the operation to change the front wheel two wheel drive into the four-wheel drive is promptly performed by the ECU 100. The actuator 24 of the power transmission apparatus 20 is driven by the command of the ECU 100, so that the driving force of the actuator 24 is inputted to the drive shaft 37 of the clutch device 23. The driving force is inputted to the input side cam mechanism 34 from the input side gear 37*n*, and is concurrently inputted to the output side cam mechanism 35 from the output side gear 37*d*.

At this time, the clutch pack 33 is promptly pressed by the output side cam mechanism 35 to be placed into the friction engagement state in which the friction engagement elements of the clutch pack 33 is brought into engagement with one another, thereby transmitting the power of the left and right rear wheels 17L, 17R to the input shaft 21 from the output shaft 22. When the input shaft 21 is rotated by the driving force of the output shaft 22, the drive pinion 14*a*, the propeller shaft 15, the transfer driven pinion 13*c* and the transfer ring gear 13*b* stopped for rotation as previously mentioned start to be rotated. The rotations of the transfer driven pinion 13*c* and the transfer ring gear 13*b* cause the front side engagement elements of the clutch device 13*a* connected with the left and right front wheels 16L, 16R and the rear side engagement elements of the left and right rear wheels 17L, 17R connected with the transfer ring gear 13*b* to take the same rotational state. This leads to the rotational synchronism, so that the clutch device 13*a* is engaged to take the connected state by the ECU 100.

Subsequently, the output side cam mechanism 35 of the clutch device 23 is brought into the movement stopped state, whereupon the pressure plate 74 of the input side cam mechanism 34 further presses the clutch pack 33 to have the frictional engagement force of the clutch pack 33 heightened, so that the power transmission amount reaches up to an adequate value. At this time, the vehicle 1 has completed the transfer to the four-wheel drive mode to take an adequate drive state in the four-wheel drive mode. Further, the operation from the time when the actuator 24 of the power transmission apparatus 20 is driven to the time when the transfer to the four-wheel drive mode is completed depends upon the models and the driving states of the vehicle 1, but lasts for a period, for example, several hundred meters the vehicle 1 travels.

The power transmission apparatus 20 according to the first embodiment is constructed as previously mentioned, and thus brings about the advantageous effects as follows.

The power transmission apparatus 20 according to the first embodiment comprises the input shaft 21, the output shaft 22, the clutch device 23, and the actuator 24. The clutch device 23 comprises the clutch hub 31, the clutch housing 32, the clutch pack 33, an input side cam mechanism 34, the output side cam mechanism 35, the return spring 36, and a drive shaft 37, so that the input side cam mechanism 34, and the output side cam mechanism 35 can be driven by the rotation of the drive shaft 37.

As a consequence, the power transmission apparatus 20, similarly to the first embodiment, can obtain such an advantageous effect that the input side cam mechanism 34 and the output side cam mechanism 35 can require no high precision machining, thereby making it possible to suppress the construction cost from being increased. Further, the power transmission apparatus 20 can set the gaps between the friction engagement elements forming part of the clutch pack 33 to be enlarged, thereby making it possible to obtain such an effect to enable the drag torque to be reduced. The output side cam mechanism 35 can promptly press the clutch pack 33 to increase the frictional engagement force of the clutch pack 33 together with the input side cam mechanism 34, thereby making it possible to obtain an excellent effect to produce the clutch device 23 having a high transmission capacity.

More specifically, the input side cam mechanism 34 is constituted by an input side drive cam plate 71, an input side driven cam plate 72, and a plurality of spherical members 73, the input side drive cam plate 71 and the input side driven cam plate 72 respectively being formed with cam grooves 71c, 72c each having a cam angle $\theta_1$ formed to have a relatively small angle. As a consequence, the driving force inputted to the input side drive cam plate 71 is increased to heighten the pressing force of the input side driven cam plate 72 to the clutch pack 33.

Further, the output side cam mechanism 35 is constituted by the output side drive cam plate 81, the output side driven cam plate 82, and a plurality of spherical members 83, the output side drive cam plate 81 and the output side driven cam plate 82 respectively being formed with cam grooves 81c, 82c each having a cam angle $\theta_2$ formed to have a relatively large angle. As a consequence, the movement amount of the spherical member 83 on the circumference of the output side drive cam plate 81 is increased, thereby making it possible to obtain an advantageous effect to enable the clutch pack 33 to promptly be brought into frictional engagement with the action of the output side driven cam plate 82.

Further, the cam grooves 81c, 82c are formed to have the output side driven cam plate 82 take the movement stopped state in which the output side driven cam plate 82 is not moved even with the rotation of the output side drive cam plate 81. As a result, the input side driven cam plate 72 can axially be moved toward the output shaft 22 by the rotation of the input side drive cam plate 71 after the output side drive cam plate 81 is rotated to take the movement stopped state.

From the foregoing description, it will be understood that when the output side cam mechanism 35 presses the clutch pack 33 simultaneously with the input side cam mechanism 34 pressing the clutch pack 33, the pressing force of the input side cam mechanism 34 and the pressing force of the output side cam mechanism 35 are acted on the same line of action and opposite to each other in the directions for the input side cam mechanism 34 and the output side cam mechanism 35 to press the clutch pack 33. The pressing forces of the input side cam mechanism 34 and the output side cam mechanism 35 are reduced to the halves of the pressing forces with the relationship of the actions and reactions of the pressing forces. This means that if the output side driven cam plate 82 is in the movement stopped state, and the pressing force of the output side cam mechanism 35 is zero, the half-reduced states of the pressing forces of the input side cam mechanism 34 and the output side cam mechanism 35 can be avoided. Therefore, the action of the input side cam mechanism 34 continues to press the clutch pack 33 in the movement stopped state of the output side driven cam plate 82 makes it possible to obtain a predetermined adequate pressing force to the clutch pack 33.

Figure 5:
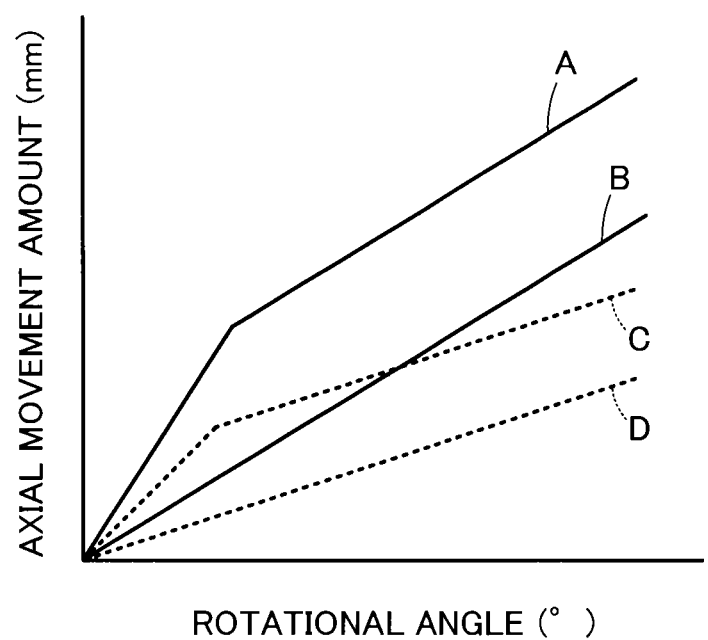
FIG. 5 is a graph showing a property of a clutch device forming part of the power transmission apparatus according to the first embodiment of the present invention, and showing the relationship between a rotational angle and an axial movement amount of the clutch device.

The power transmission apparatus 20 according to the first embodiment is constructed to be able to adjust responsiveness as will be seen from FIG. 5. FIG. 5 show relationships between rotational angles (°) of the clutch device 23 according to the first embodiment, viz., the circumferential movement amounts (mm) of the spherical members 73, 83 and the axial movement amounts of the input side driven cam plate 72 and the output side driven cam plate 82.

In FIG. 5, the solid broken line A indicates a property of the clutch device 23 according to the first embodiment, viz., a property of a clutch device having what is called a double cam mechanism, while the solid line B indicates a property of the clutch device having a double cam mechanism with the input side cam mechanism 34 and the output side cam mechanism 35 partly forming the first embodiment of the power transmission apparatus 20 being the same in construction. Further, the dotted broken line C indicates a property of the clutch device having a single cam mechanism forming part of a conventional cam mechanism formed with a plurality of cam grooves different in cam angle on the same circumference that is what is called a two-stage cam surface. Further, the dotted broken line D indicates a property of the clutch device having a cam mechanism forming part of a conventional cam mechanism formed with cam surfaces single and thus the same in a shape.

As indicated by the solid broken line A, it can be understood that the axial movement amount with respect to the rotational angle is sharply rising within a range in which the rotational angle is small, and that the solid broken line A indicates a sharper responsiveness compared to the dotted broken line C. Further, once the rotational angle exceeds a predetermined range, the axial movement amount with respect to the rotational angle shows a gentler inclination, however, the pressing force of the cam mechanism can be increased as previously mentioned, thereby making it possible to obtain a clutch device having the high transmission capacity.

The clutch device 23 of the power transmission apparatus 20 according to the present embodiment has been explained raising an example in which the input side radius $R_1$ is the same in distance as the output side radius $R_2$.

However, the clutch device 23 of the power transmission apparatus 20 according to the present invention may be constructed with the input side radius $R_1$ being different in distance from the output side radius $R_2$. For example, the clutch device 23 of the power transmission apparatus 20 according to the present invention may be constructed with an output side cam mechanism 35A (see FIG. 6) having the input side radius $R_1$ different in distance from the output side radius $R_2$ in lieu of the output side cam mechanism 35.

Figure 6:
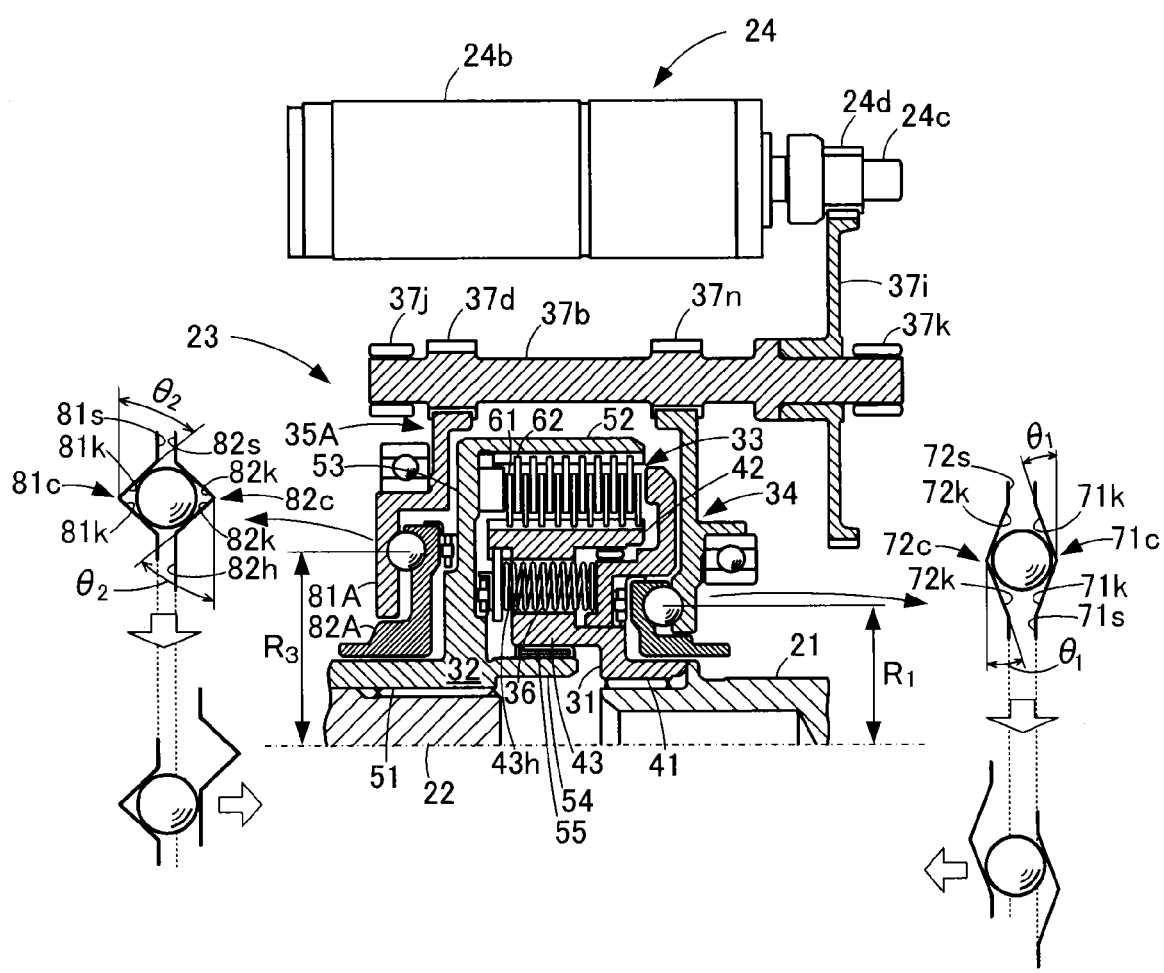
FIG. 6 is another cross-sectional view of the essential portion forming part of the power transmission apparatus according to the first embodiment of the present invention, the essential portion being raised as an altered construction thereof.

As shown in FIG. 6, the output side cam mechanism 35A may comprise an output side drive cam plate 81A, an output side driven cam plate 82A, a plurality of spherical members 83, and a bearing 84.

More specifically, the output side cam mechanism 35A is constructed to have the output side drive cam plate 81A and the output side driven cam plate 82A with the output side radius $R_3$, viz., the distance between the center point of the spherical member 83 and the center axis of the output shaft 22 being larger than the output side radius $R_1$ The output side cam mechanism 35 according to the first embodiment thus constructed can increase the increasing percentage having the circumferential movement amount of the output side drive cam plate 81 increased to the axial movement amount of the output side driven cam plate 82. More specifically, the fact that the output side radius $R_3$ is larger than the input side radius $R_1$ results in the fact that the circumferential movement amount of the spherical member 83 can be enlarged if the drive shaft 37 is rotated at the same rotation angle. As a consequence, the axial movement amount of the output side driven cam plate 82 can be enlarged to make the increasing percentage more increased than that of the axial movement amount of the output side driven cam plate 82 with the input side radius being equal to the output side radius.

(Second Embodiment)

A power transmission apparatus 120 according to the second embodiment to be applied to the vehicle 1 is constructed to have a clutch device 123 in lieu of the clutch device 23 according to the first embodiment, and other elements and parts the same in construction as those of the power transmission apparatus 120 according to the first embodiment. Therefore, the other elements and parts the same in construction as those of the power transmission apparatus 120 according to the first embodiment will be described hereinafter with the same reference numerals and legends used for explanation in the first embodiment shown in FIGS. 1 to 4. Only the elements and parts different in construction from those of the power transmission apparatus 120 according to the first embodiment will be described hereinafter.

The power transmission apparatus 120 comprises an input shaft 21, an output shaft 22, the clutch device 123, and an actuator 24.

Figure 7:
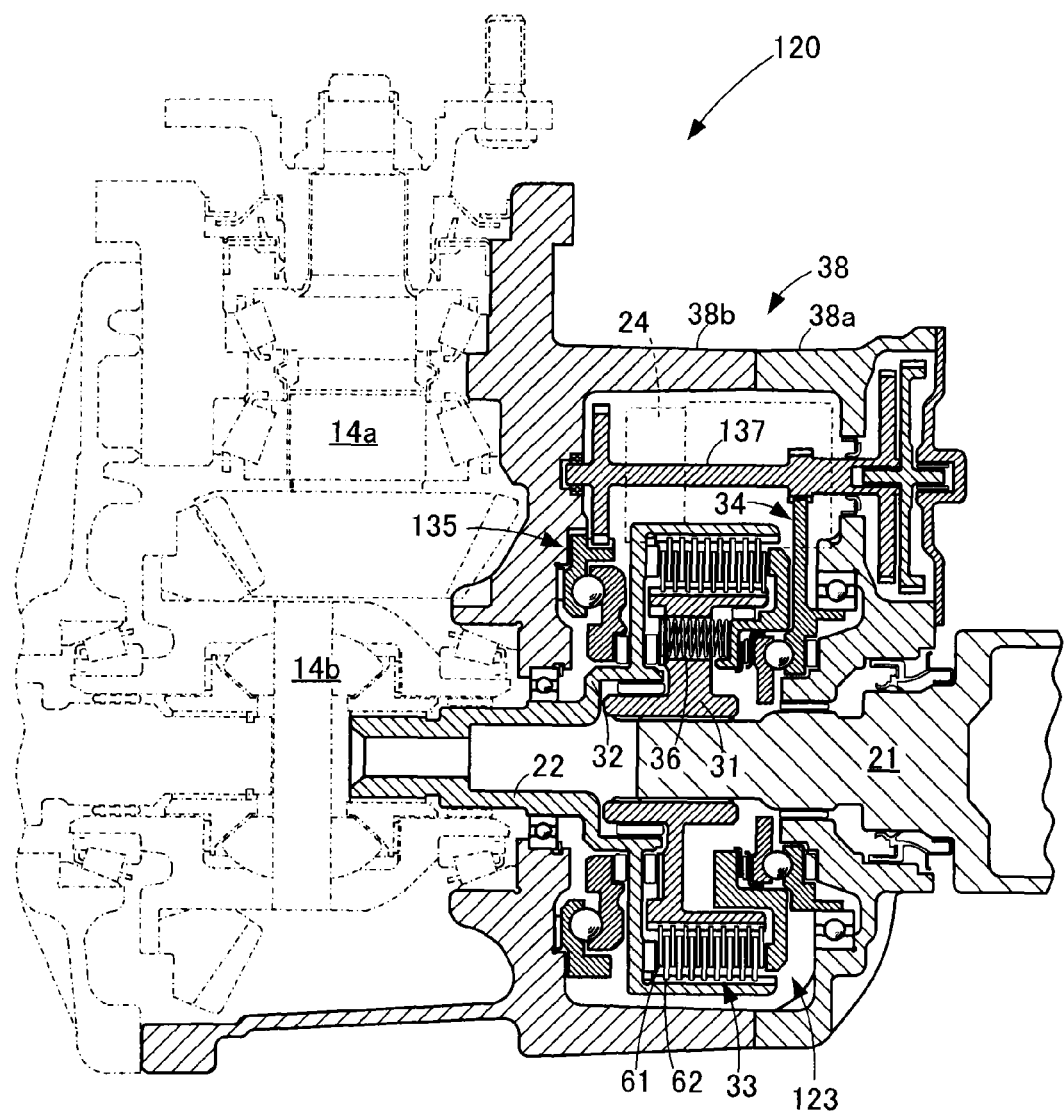
FIG. 7 is a cross-sectional view of the power transmission apparatus according to the second embodiment of the present invention.
Figure 8:
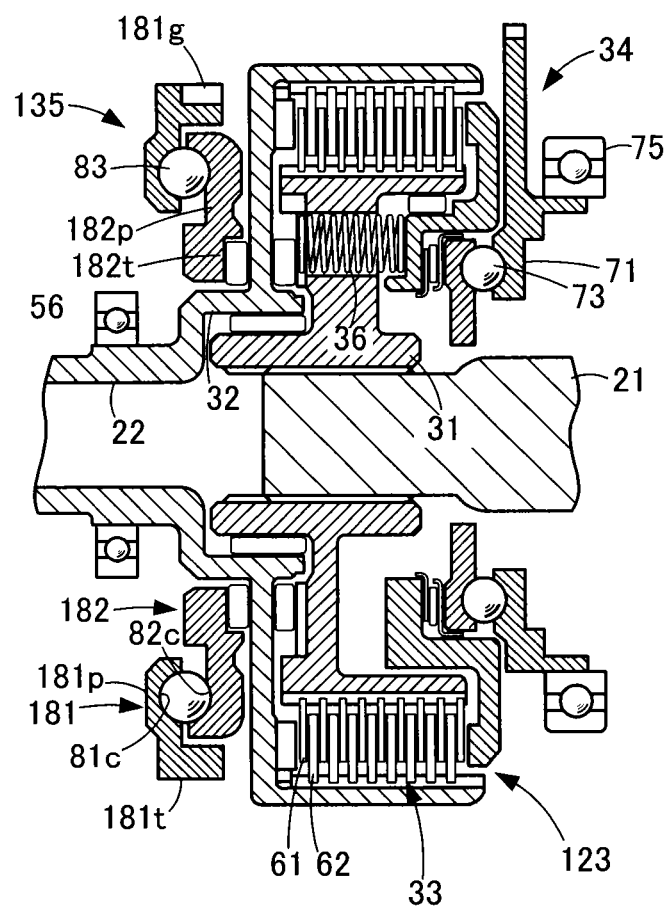
FIG. 8 is a cross-sectional view of an essential portion forming part of the power transmission apparatus according to the second embodiment of the present invention.
Figure 9:
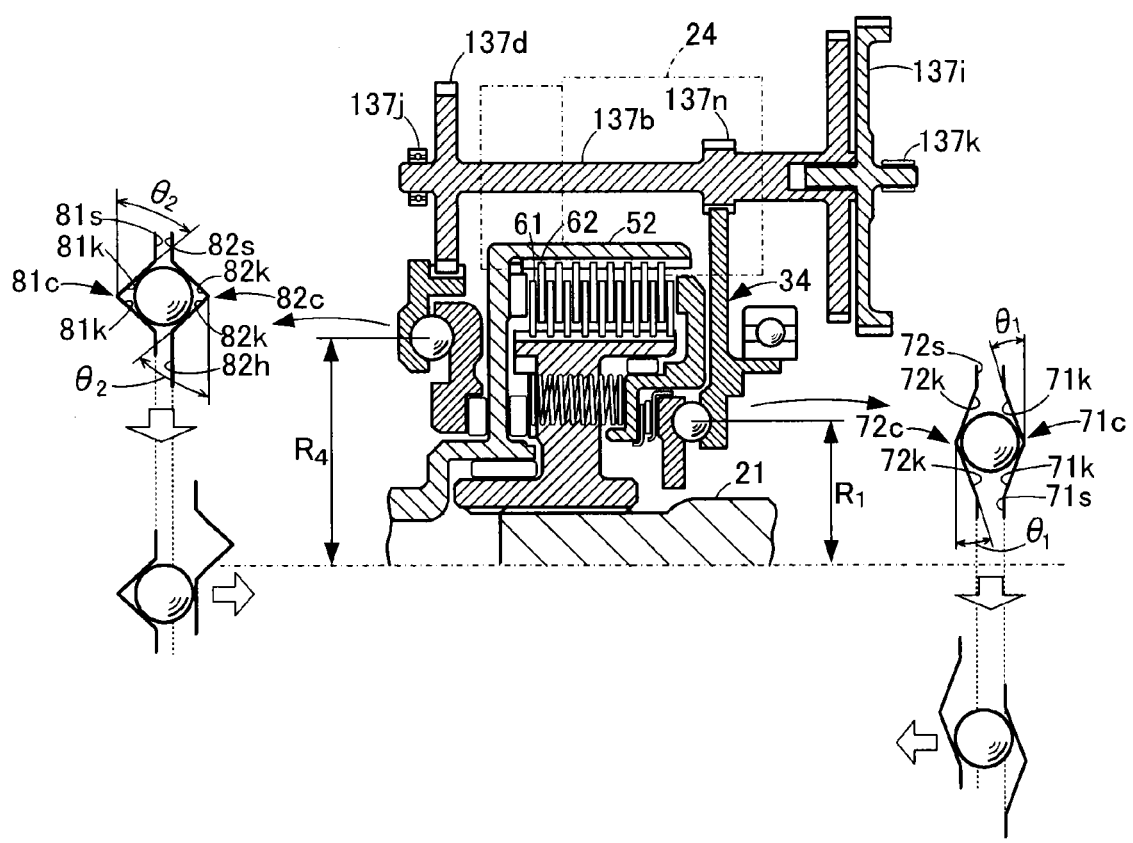
FIG. 9 is another cross-sectional view of the essential portion forming part of the power transmission apparatus according to the second embodiment of the present invention.

The clutch device 123 is constructed with the same constitutional elements and parts as those of the first embodiment except for an output side cam mechanism 135 and a drive shaft 137 as shown in FIGS. 7, 8. Explanation will be made about the output side cam mechanism 135 hereinafter.

The output side cam mechanism 135 has an output side drive cam plate 181, an output side driven cam plate 182, and a plurality of spherical members 83. The output side cam mechanism 135 is constituted by a ball cam mechanism as in the same construction as the output side cam mechanism 35 according to the first embodiment, in which the output side drive cam plate 181 is rotated to have the output side driven cam plate 182 axially moved toward the input shaft 21 through the spherical members 83 to press the clutch housing 32 and the clutch pack 33.

The output side drive cam plate 181 has a plate portion 181p formed in a disc shape, a projection portion 181t formed to project toward the clutch pack 33 from the plate portion 181p, a gear portion 181g partly formed on the projection portion 181t, and a plurality of cam grooves 81c formed on the peripheral portion of the inner plate portion 181p to be circumferentially equally spaced apart from one another. The cam grooves 81c of the output side drive cam plate 181 are the same in construction as those of the output side drive cam plate 81 in the first embodiment. The output side drive cam plate 181 is adapted to be rotated by the driving force of the actuator 24 inputted through the gear portion 181g. The cam grooves 81c are formed at a position with an output side radius R4 connecting the center of the cam groove 81c and the center axis of the output shaft 22. This means that the distance between the center of the spherical member 83 and the center axis of the output shaft 22 is equal to the output side radius R4, at the time when the spherical member 83 is received in the cam groove 81c.

The output side driven cam plate 182 has a plate portion 182p, a pressure portion 182t formed on the plate portion 182p facing the clutch pack 33, and a plurality of cam grooves 82c formed on the circumference of the plate portion 182p to be positioned in face-to-face relationship with the cam grooves 81c, respectively. The output side driven cam plate 182 is adapted to axially be moved away from the output side drive cam plate 181 through the spherical members 83 by the rotation of the output side drive cam plate 181 in the manner the same as that of the first embodiment.

Further, the distance between the center of the spherical member 83 and the center axis of the output shaft 22 is equal to the output side radius R4, at the time when the spherical member 83 is received in the cam groove 81c. Here, the output side radius R4 is formed to be larger than the input side radius $R_1$.

The drive shaft 137 has a shaft body 137b, an input side gear 137n, an output side gear 137d, and an input gear 137i. The input side gear 137n and the output side gear 137d respectively constitute an input side transmission element and an output side transmission element as defined in the present invention. The input gear 137i is adapted to be inputted with the driving force of the actuator 24. The drive shaft 137 has a bearing 137j and a bearing 137k assembled between the case 38 and the drive shaft 137 to have the both axial end portions of the shaft body 137b rotatably supported on the case 38. The input gear 137i is adapted to reduce the rotational speed of the actuator 24.

The output side gear 137d is formed in a shape different from the input side gear 137n in the present embodiment different from the first embodiment. The input side gear 137n and the output side gear 137d are constructed to make more increased in rotational speed the power transmission from the output side gear 137d to the gear portion 181g of the output side drive cam plate 181 than the power transmission from the input side gear 137n to the gear portion 71g of the input side drive cam plate 71 by the rotation of the shaft body 137b of the drive shaft 137.

The power transmission apparatus 120 according to the second embodiment is operated in the manner the same as that of the power transmission apparatus 20 according to the first embodiment.

The power transmission apparatus 120 according to the second embodiment is constructed as previously mentioned, so that the power transmission apparatus 120 according to the second embodiment can obtain an advantageous effect the same as that of the power transmission apparatus 20 according to the first embodiment.

More specifically, the power transmission apparatus 120 according to the second embodiment comprises the input shaft 21, the output shaft 22, the clutch device 123, and the actuator 24. The clutch device 123 comprises the clutch hub 31, the clutch housing 32, a clutch pack 33, an input side cam mechanism 34, the output side cam mechanism 135, a return spring 36, and the drive shaft 137, the input side cam mechanism 34 and the output side cam mechanism 135 being constructed to be driven by the rotation of the drive shaft 137.

As a consequence, the power transmission apparatus 120, similarly to the first embodiment, can obtain such an advantageous effect that the input side cam mechanism 34 and the output side cam mechanism 135 can require no high precision machining, thereby making it possible to suppress the construction cost from being increased. Further, the power transmission apparatus 120 can set the gaps between the friction engagement elements forming part of the clutch pack 33 to be enlarged, thereby making it possible to obtain such an effect to enable the drag torque to be reduced. The output side cam mechanism 135 can promptly press the clutch pack 33 to increase the frictional engagement force of the clutch pack 33 together with the input side cam mechanism 34, thereby making it possible to obtain an excellent effect to produce the clutch device 123 having the high transmission capacity.

More specifically, similarly to the first embodiment, the input side cam mechanism 34 can obtain such an effect to enhance the pressing force to the clutch pack 33. The output side cam mechanism 135 is constituted by an output side drive cam plate 181, an output side driven cam plate 182, and a plurality of spherical members 83, the output side drive cam plate 181 and the output side driven cam plate 182 respectively being formed with cam grooves 81c, 82c each having a cam angle $\theta_2$ formed to have a relatively large angle. As a consequence, the movement amount of the spherical member 83 on the circumference of the output side drive cam plate 181 is increased, thereby making it possible to obtain an advantageous effect to enable the clutch pack 33 to promptly be brought into frictional engagement with the action of the output side driven cam plate 182. Especially, the rotational speed inputted to the output side drive cam plate 181 is increased, so that the movement amount of the spherical member 83 is more increased than that of the spherical member in the first embodiment, thereby making it possible to enhance the responsiveness at a higher level than that in the first embodiment.

Further, the cam grooves 81c, 82c are, similarly to the first embodiment, formed to have the output side driven cam plate 182 take a movement stopped state in which the output side driven cam plate 182 is not moved even with the rotation of the output side drive cam plate 181. As a result, the input side driven cam plate 72 can axially be moved toward the output shaft 22 by the rotation of the input side drive cam plate 71 after the output side drive cam plate 181 is rotated to take the movement stopped state. Similarly to the first embodiment, the action of the input side cam mechanism 34 continuing to press the clutch pack 33 in the movement stopped state of the output side driven cam plate 182, makes it possible to obtain a predetermined adequate pressing force to the clutch pack 33.

The power transmission apparatus 120 according to the second embodiment has been described raising an example in which the power transmission apparatus 120 is constructed to have the output side gear 137d of the drive shaft 137 is held in direct mesh with the gear portion 181g of the output side drive cam plate 181.

The above power transmission apparatus 120 is, however, constituted to have the output side gear of the drive shaft different in structure from that of the power transmission apparatus according to the second embodiment.

Figure 10:
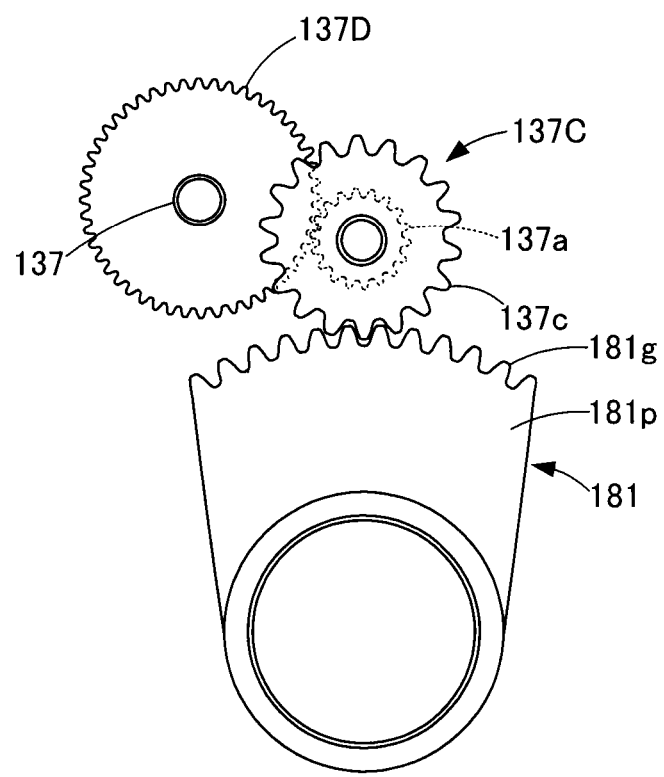
FIG. 10 is another cross-sectional view of the essential portion forming part of the power transmission apparatus according to the second embodiment of the present invention, the essential portion being raised as an altered construction thereof.
Figure 11:
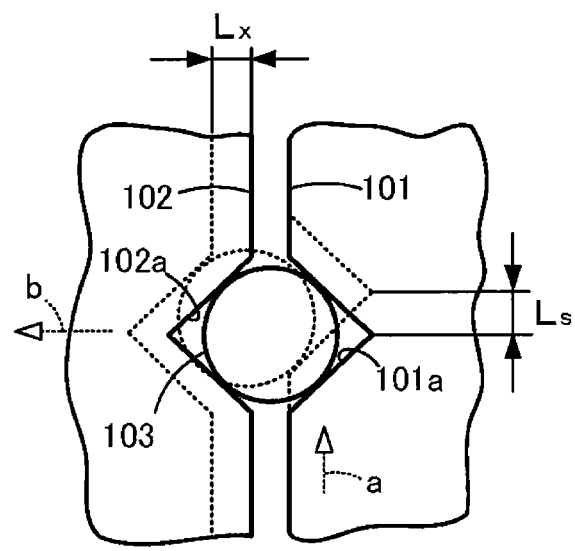
FIG. 11 is a schematic view of a conventional cam mechanism, showing a circumferential movement amount and an axial movement amount of the conventional cam mechanism.
Figure 12:
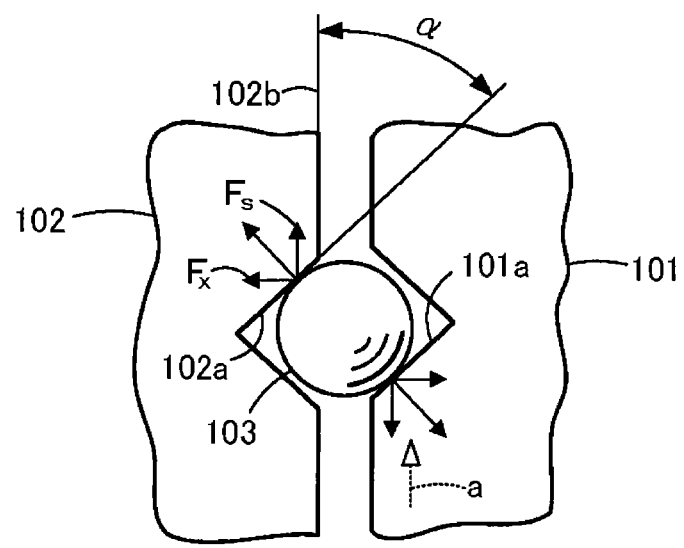
FIG. 12 is a schematic view of the conventional cam mechanism, showing a circumferential force and an axial force generated on the conventional cam mechanism.
Figure 13:
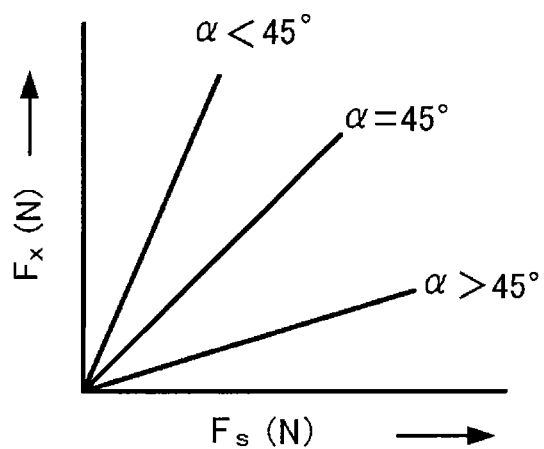
FIG. 13 is a graph of the conventional cam mechanism, showing the relationship between the circumferential force and the axial force generated on the conventional cam mechanism.
Figure 14:
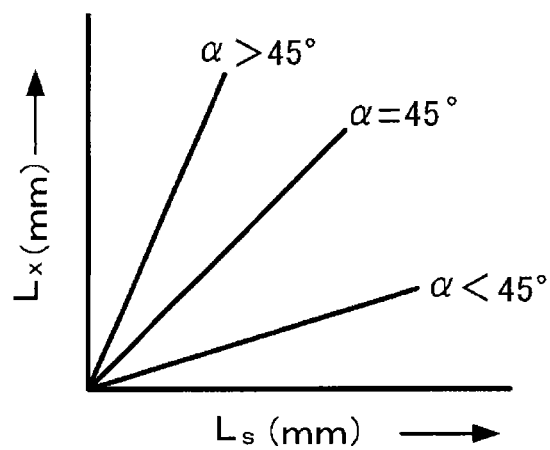
FIG. 14 is a graph of the conventional cam mechanism, showing the relationship between the circumferential movement amount and the axial movement amount of the conventional cam mechanism.

For example, as shown in FIG. 10, the output side gear may be constituted by a drive gear 137D, and a counter gear 137C. Further, the counter gear 137C is constituted by a small gear 137a held in mesh with the drive gear 137D, and a large gear 137c held in mesh with the gear portion 181g of the output side drive cam plate 181. The counter gear 137C has a shaft, and a bearing not shown in the drawings, and is rotatably supported on the case 38 through the bearing. This construction makes it possible to further increase the rotational speed to be transmitted to the gear portion 181g from the drive gear 137D, thereby making it possible to remarkably enhance the responsiveness of the output side cam mechanism 135.

The first and second embodiments have been described about the case in which the power transmission apparatuses 20, 120 are provided on the drive shaft between the differential mechanism 14b of the part time four-wheel drive wheel and the left rear wheel 17L.

The power transmission apparatus according to the present invention, however, may be provided on a shaft other than the previously mentioned drive shaft. For example, the power transmission apparatus according to the present invention may be provided on the shaft between the propeller shaft and the rear differential. The present invention is not limited to those examples, but may be applied to control the power transmission from the input side to the output side by providing the power transmission on any kind of shaft or shafts capable of transmitting the power.

The first and second embodiments have been explained raising examples in which the input shaft 21 of power transmission apparatuses 20, 120 is provided with the input side cam mechanism 34 capable of obtaining a relatively high pressing force, and the output shaft 22 is provided with the output side cam mechanisms 35, 135 capable of obtaining a high responsiveness.

The power transmission apparatus according to the present invention, however, may be constituted with the input side and the output side opposite to each other. This means that the input shaft is provided thereon with a cam mechanism capable of obtaining the high responsiveness, while the output shaft is provided thereon with a cam mechanism capable of obtaining a high pressing force.

From the foregoing description, it will be under stood that the power transmission apparatus according to the present invention can require no high precision machining and can reduce the drag torque, and is provided with the clutch device having the high responsiveness and a large engagement force.

EXPLANATION OF REFERENCE NUMERALS 20, 120: power transmission apparatus
21: input shaft
22: output shaft
23, 123: clutch device
24: actuator
31: clutch hub
32: clutch housing
33: clutch pack
34: input side cam mechanism
35, 35A, 135: output side cam mechanism
36: return spring
37, 137: drive shaft
37d, 137d: output side gear
37n, 137n: input side gear
38: case
61: inner clutch plate
62: outer clutch plate
71: input side drive cam plate
71c, 72c, 81c, 82c: cam groove
72: input side driven cam plate
73, 83: spherical member
74: pressure plate
81, 81A, 181: output side drive cam plate
82, 82A, 182: output side driven cam plate

The invention claimed is:
1. A power transmission apparatus comprising:
an input shaft inputted with power,
an output shaft to output the power,
a clutch device operative to be changed to selectively take
  a disconnected state in which the power is disconnected between the input shaft and the output shaft or a connected state in which the power is connected between the input shaft and the output shaft, and
an actuator to drive the clutch device,
the clutch device comprising:
  an input side rotation element integrally rotated with the input shaft,
  an output side rotation element integrally rotated with the output shaft, an engagement element pack constituted by a plurality of input side friction engagement elements integrally rotated with the input side rotation element and a plurality of output side friction engagement elements integrally rotated with the output side rotation element, an input side cam mechanism that presses the engagement element pack toward the output shaft, an output side cam mechanism that presses the engagement element pack toward the input shaft from an opposite side to the input side cam mechanism, an urging element that urges the engagement element pack to have the input side friction engagement elements and the output side friction engagement elements axially moved away from each other, and a drive shaft including an input side transmission element that transmits a driving force outputted from the actuator to the input side cam mechanism, and an output side transmission element that transmits the driving force to the output side cam mechanism, the input side cam mechanism and the output side cam mechanism being driven by a rotation of the drive shaft.

2. The power transmission apparatus as set forth in claim 1, in which the input side transmission element is constituted by an input side gear, the input side cam mechanism including an input side drive cam plate formed with a gear held in mesh with the input side gear, an input side driven cam plate, a plurality of spherical members respectively sandwiched between a plurality of cam grooves formed on a circumferential portion of the input side drive cam plate and a plurality of cam grooves formed on a circumferential portion of the input side driven cam plate respectively facing the cam grooves of the circumferential portion of the input side drive cam plate, the input side drive cam plate being rotated to have the input side driven cam plate axially moved toward the output shaft through the spherical members and thereby to press the engagement element pack.

3. The power transmission apparatus as set forth in claim 2, in which the output side transmission element is constituted by an output side gear, the output side cam mechanism including an output side drive cam plate formed with a gear held in mesh with the output side gear, an output side driven cam plate, a plurality of spherical members respectively sandwiched between a plurality of cam grooves formed on a circumferential portion of the output side drive cam plate and a plurality of cam grooves formed on a circumferential portion of the output side driven cam plate respectively facing the cam grooves of the circumferential portion of the output side drive cam plate, the output side drive cam plate being rotated to have the output side driven cam plate axially moved toward the input shaft through the spherical members and thereby to press the engagement element pack.

4. The power transmission apparatus as set forth in claim 3, in which the cam grooves of the output side drive cam plate and the output side driven cam plate are formed to have the output side driven cam plate take a movement stopped state where the output side driven cam plate is at a standstill even with a rotation of the output side drive cam plate, and the cam grooves of the input side drive cam plate and the input side driven cam plate are formed to have the input side driven cam plate axially moved toward the output shaft with a rotation of a input side drive cam plate after the output side drive cam plate is rotated to take the movement stopped state.

5. The power transmission apparatus as set forth in claim 3, in which the input side driven cam plate has an input side movement amount axially moved toward the output shaft by the rotation of the drive shaft, and the output side driven cam plate has an output side movement amount axially moved toward the input shaft by the rotation of the drive shaft, the cam grooves of the output side drive cam plate and the output side driven cam plate are formed to have the output side movement amount larger than the input side movement amount.

6. The power transmission apparatus as set forth in claim 3, in which the input side cam mechanism has an input side radius connecting a center point of the spherical member forming part of the input side cam mechanism and a center axis of the input shaft, the output side cam mechanism has an output side radius connecting a center point of the spherical member forming part of the output side cam mechanism and a center axis of the output shaft, and the cam grooves of the output side drive cam plate and the output side driven cam plate are formed to have the output side radius of the output side cam mechanism larger than the input side radius of the input side cam mechanism, so that a movement of the output side driven cam plate can be faster than a movement of the input side driven cam plate.

7. The power transmission apparatus as set forth in claim 3, in which the output side gear and a gear of the output side drive cam plate are formed to have a gear ratio of the output side gear of the drive shaft and the gear of the output side drive cam plate become smaller than a gear ratio of the input side gear of the drive shaft and the gear of the input side drive cam plate, so that a movement of the output side driven cam plate can be faster than a movement of the input side driven cam plate.

\* \* \* \* \*